United States Patent
Matsuda et al.

(10) Patent No.: US 7,475,213 B2
(45) Date of Patent: Jan. 6, 2009

(54) STORAGE CONTROL SYSTEM AND STORAGE CONTROL METHOD

(75) Inventors: Jun Matsuda, Odawara (JP); Mikio Fukuoka, Odawara (JP); Keishi Tamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 11/304,645

(22) Filed: Dec. 16, 2005

(65) Prior Publication Data

US 2007/0088930 A1      Apr. 19, 2007

(30) Foreign Application Priority Data

Oct. 18, 2005   (JP) .............................. 2005-303348

(51) Int. Cl.
    *G06F 12/02*    (2006.01)
    *G06F 3/06*     (2006.01)
(52) U.S. Cl. ............................ 711/170; 711/113; 714/2
(58) Field of Classification Search ................. 711/113, 711/170; 714/2
    See application file for complete search history.

(56) References Cited

U.S. PATENT DOCUMENTS

| | | | | |
|---|---|---|---|---|
| 4,979,055 A | * | 12/1990 | Squires et al. ................. 360/69 |
| 5,555,389 A | * | 9/1996 | Satoh et al. ................. 711/100 |
| 5,895,485 A | * | 4/1999 | Loechel et al. ............... 711/119 |
| 6,148,367 A | | 11/2000 | Tsuboi et al. |
| 6,173,377 B1 | * | 1/2001 | Yanai et al. ................. 711/162 |
| 6,567,889 B1 | * | 5/2003 | DeKoning et al. ........... 711/114 |
| 6,647,474 B2 | * | 11/2003 | Yanai et al. ................. 711/162 |
| 7,143,240 B2 | * | 11/2006 | Hsu et al. .................... 711/128 |
| 2002/0156972 A1 | * | 10/2002 | McKnight et al. ............ 711/114 |
| 2003/0204597 A1 | * | 10/2003 | Arakawa et al. ............. 709/226 |
| 2003/0217119 A1 | * | 11/2003 | Raman et al. ............... 709/219 |
| 2004/0024975 A1 | * | 2/2004 | Morishita et al. ........... 711/147 |
| 2004/0117441 A1 | | 6/2004 | Liu et al. |
| 2005/0071559 A1 | | 3/2005 | Tamura et al. |
| 2005/0097402 A1 | * | 5/2005 | Baba ........................... 714/42 |

FOREIGN PATENT DOCUMENTS

| | | |
|---|---|---|
| JP | 2005-107645 | 4/2005 |
| JP | 2005-115506 | 4/2005 |

\* cited by examiner

*Primary Examiner*—Kevin L Ellis
*Assistant Examiner*—Jared I Rutz
(74) *Attorney, Agent, or Firm*—Antonelli, Terry, Stout & Kraus, LLP.

(57) ABSTRACT

The present invention provides a storage control system that can prevent capacity in a cache memory from being overloaded even when the access performance of a controller in a storage controller to an external storage device in an external storage controller is permanently or temporarily poor.

In the storage control system, a first storage controller is connected to a storage device in a second storage controller and the first storage controller is configured to be able to write/read data to/from the storage device in the second storage controller in response to a request from a host device connected to the first storage controller. The first storage controller includes a controller for controlling data transmission and reception between the host device and the storage device in the second storage controller, and a cache memory for temporarily storing the data, and the controller sets a threshold value for storage capacity in the cache memory assigned to the storage device according to the properties of the storage device.

12 Claims, 14 Drawing Sheets

| VDEV | EXTERNAL DEVICE INFORMATION | | | PATH INFORMATION | |
| --- | --- | --- | --- | --- | --- |
| | DEVICE RECOGNITION INFORMATION | CAPACITY (KB) | DEVICE TYPE | WWN | LUN |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | - | TAPE | 0x445566AAB | 5 |
| 3 | AABBCCDDEE | 5,544223 | DISK | 0x77DE12345 | 6 |
| | | | | 0x77DE12345 | 3 |
| | | | | 0x377DE7890 | 5 |

ALTERNATE PATH (last two rows)

FIG.6
(a)
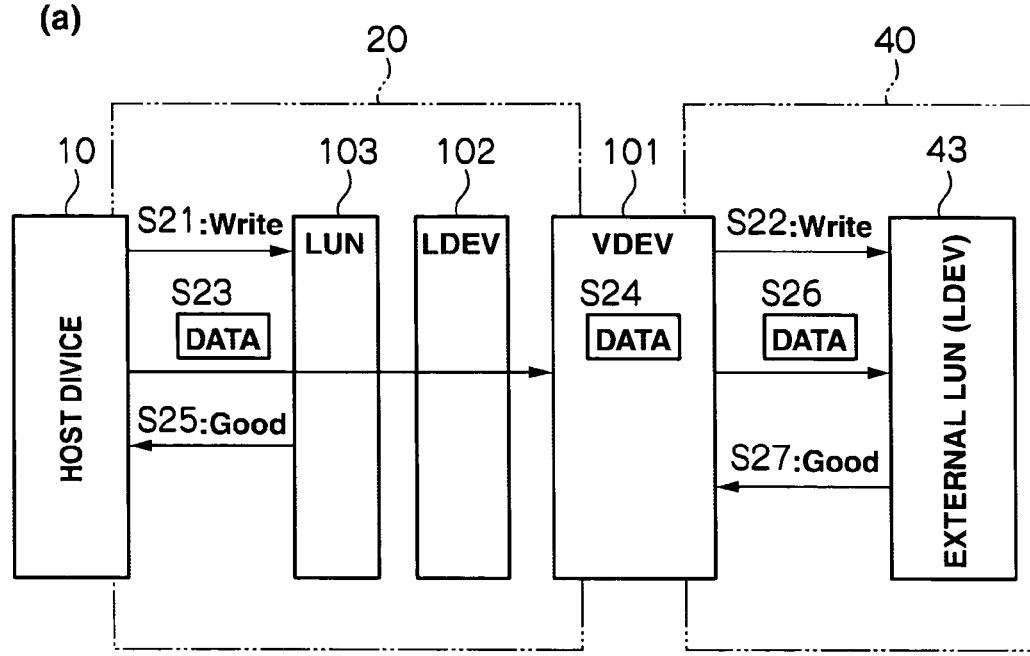
(b)
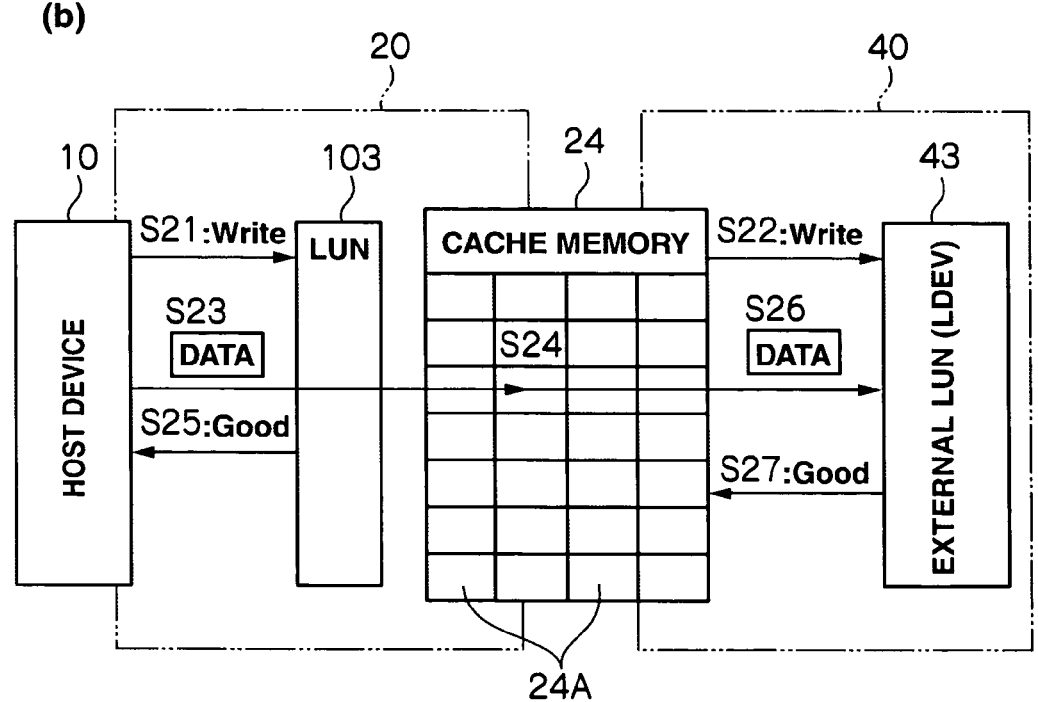

FIG.8
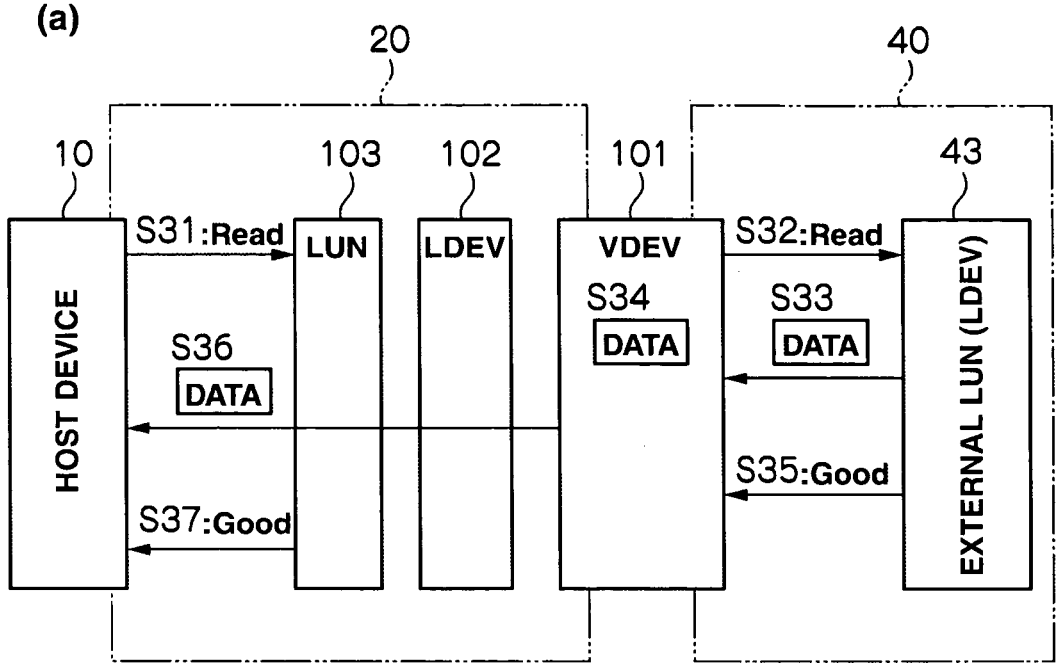
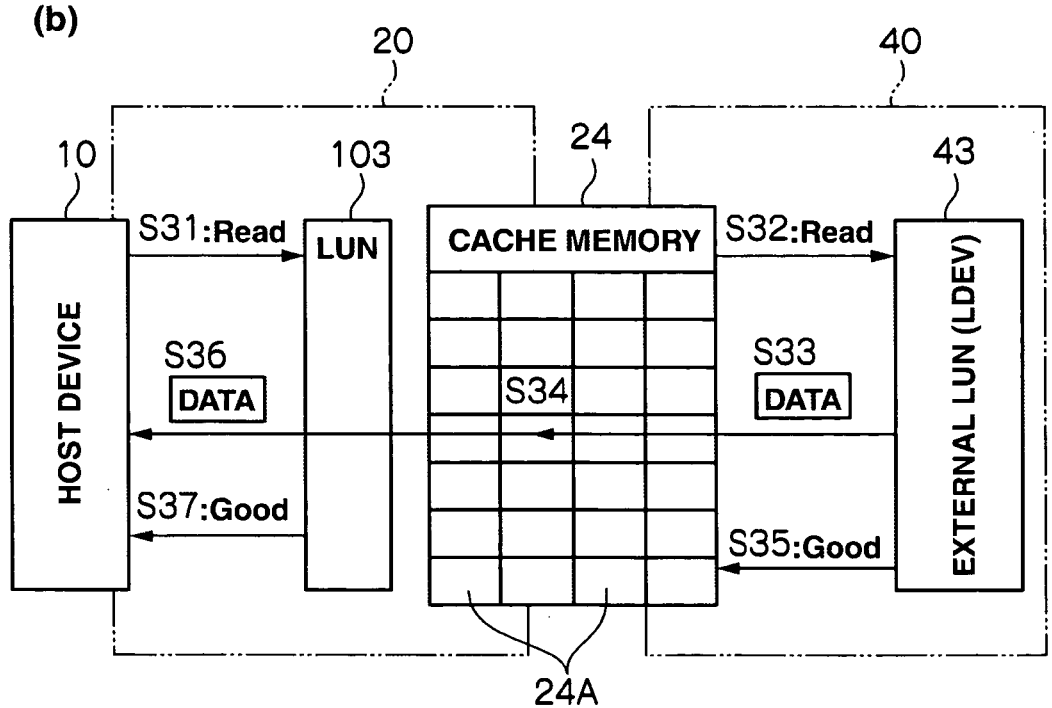

FIG.13

| ERROR NAME | USP | APPARATUS OTHER THAN USP |
|---|---|---|
| | THRESHOLD VALUE | |
| BUSY | 64 RETRIES | 32 RETRIES |
| SUSPENSION | 18 RETRIES | 12 RETRIES |
| TASK SET FULL | 32 RETRIES | 16 RETRIES |
| TASK ABORTED | 64 RETRIES | 32 RETRIES |
| OTHER ERROR | 64 RETRIES | 32 RETRIES |

FIG.14

| CACHE AMOUNT TO THE THRESHOLD / RESPONSE | 30% OR LESS | 30%-50% | 50%-80% | MORE THAN 80% |
|---|---|---|---|---|
| 10-50ms | 50ms | 100ms | 500ms | MAXIMUM HOST TIMEOUT TIME |
| 50-100m | 100ms | 500ms | 1s | MAXIMUM HOST TIMEOUT TIME |
| 100-200 | 500ms | 1s | 3s | MAXIMUM HOST TIMEOUT TIME |
| MORE THAN 1s | 1s | 3s | 5s | MAXIMUM HOST TIMEOUT TIME |

FIG.15

| PATH MODEL | PATH REDUNDANCY: 2 OR MORE | PATH REDUNDANCY: 1 | NO PATH REDUNDANCY |
|---|---|---|---|
| A/A : Active/Active | - | -5% | -10% |
| A/P : Active/Possive | - | - | -5% |
| A/S : Active/Standby | - | - | -3% |

FIG.16

| NUMBER OF COMMANDS PER SECOND \ A/B | LESS THAN 5/4 | 5/4 OR MORE |
|---|---|---|
| 100 OR MORE | - | 10ms |
| 200 | 3ms | 5ms |
| 500 | 0.5ms | 1ms |
| 1000 | 0.3ms | 0.5ms |
| MORE THAN 1000 | 0.1ms | 0.3ms |

STORAGE CONTROL SYSTEM AND STORAGE CONTROL METHOD

CROSS-REFERENCE TO RELATED APPLICATIONS

This application relates to and claims priority from Japanese Patent Application No. 2005-303348, filed on Oct. 18, 2005, the entire disclosure of which is incorporated herein by reference.

BACKGROUND OF THE INVENTION

The present invention relates to a storage control system including a storage controller that is connected to a host computer and performs data communication with the host computer.

A database system handling large scale data, such as a data center, manages the data using a storage control system configured separately from a host computer. This storage control system includes, for example, a disk array apparatus. A number of storage devices are arranged in arrays in the disk array apparatus, which is configured based on, for example, RAID (Redundant Array of Independent (Inexpensive) Disks). On a physical storage area provided by the storage device group, at least one logical volume, being a logical storage area, is formed, and this logical volume is provided to a host computer (more specifically, a database program that operates on the host computer), which is a host system. The host computer can write/read data to/from the logical volume by transmitting a predetermined command thereto.

It has been proposed to connect a second storage controller to the storage controller to improve the performance of the storage control system (Patent Reference 1: JP-A-2005-115506). In this case, the first storage controller can manage a storage area in the second storage apparatus as if it is a storage area in its own storage apparatus by linking this storage area to a storage area in the first storage controller. When the second storage controller is connected to the first storage controller from outside, a new storage area (virtual logical volume) is virtually set in the first storage controller to link the storage area in the first storage controller to that in the second storage controller. Thus, data exchange can be performed between the storage areas in the first and second storage controllers via the virtual logical volume. Note that Patent Reference 2 (JP-A-2005-107645) discloses a storage control system that temporarily ceases processing for input/output that the storage control system receives from the host device to avoid data destruction and input/output failures during system operation, in order to provide a storage control system in which information about the configuration of a disk array switch group is modified.

SUMMARY OF THE INVENTION

In the storage controller described in Patent Reference 1, when the first storage controller writes data to a logical volume in the second storage apparatus in response to a write command from the host device, the first storage controller temporarily stores the write data in its own cache memory and then stores it to the storage device in the second storage apparatus. If the response performance of the storage device in the second storage controller is poor or a failure occurs in the communication with the external storage device, it takes a long time for the first storage controller to complete the data-write to the external storage device; meanwhile dirty data accumulates in the cache memory and storage capacity that new data will be stored to is overloaded. Therefore, the controller becomes unable to store new data in other storage devices, and thus affects other storage devices. Also, Patent Reference 2 does not disclose an improvement on the state where dirty data accumulates in a cache memory in the storage controller and new data cannot be stored in the cache memory.

To solve that problem, an object of the present invention is to provide a storage control system that can prevent the capacity of a cache memory from being overloaded even when the access performance of a controller in a storage controller to an external storage device in an external storage controller is poor. Another object of the invention is to provide a storage control system that identifies the possibility that capacity of a cache memory is overloaded and is secure from failure occurrence in the storage controller storing new data to an external storage device.

To achieve the above-stated objects, the storage control system according to the present invention can detect the state in a storage device that leads to capacity overload in the cache memory and prevents excessive data from being stored to the cache memory.

According to an aspect of the present invention, the invention provides a storage control system in which a first storage controller is connected to a storage device in a second storage controller and the first storage controller is configured to be able to read/write data from/to the storage device in the second storage controller in response to a request from a host device connected to the first storage controller, the first storage controller including: a controller for controlling data transmission and reception between the host device and the storage device in the second storage controller; and a cache memory for temporarily storing the data, wherein the controller sets a threshold value for the storage capacity in the cache memory for the storage device in accordance with properties of the storage device.

According to a second aspect of the present invention, the invention provides a storage control system in which a first storage controller is connected to a storage device in a second storage controller and the first storage controller is configured to be able to write data to the storage device in the second storage controller in response to a request from a host device connected to the first storage controller, the first storage controller including: a controller for controlling data transmission and reception between the host device and the storage device in the second storage controller; and a cache memory for temporarily storing the data, wherein the controller sets a threshold value for the storage capacity in the cache memory for the storage device in accordance with the properties of the storage device when the storage device is connected to the first storage controller; compares the threshold value with the capacity in the cache memory used for the storage device; and executes a "write-through cache operation" writing the data to the storage device in response to a request from the host device, without using the cache memory, when the capacity used exceeds the threshold value.

Furthermore, according to a third aspect of the invention, the present invention provides a storage control method in which a first storage controller is connected to a storage device in a second control storage apparatus and the first storage controller is configured to be able to write data to the storage device in the second storage controller in response to a request from the host device connected to the first storage controller, including the steps of: controlling data transmission between the host device and the storage device in the second storage controller; temporarily storing the data to a cache memory in the first storage controller; and setting a threshold value for the storage capacity in the cache memory for the storage device in accordance with properties of the storage device.

As described above, the preset invention can provide a storage control system that can prevent the capacity of the cache memory from being overloaded even when the performance of a controller is bad when accessing the external storage device in the external storage controller is poor. Moreover, the invention can provide a storage control system that specifies a possibility that the capacity in the cache memory might be overloaded, and that is secure from the failure occurrence in the controller in the storage controller storing new data to the external storage device.

BRIEF DESCRIPTION OF THE DRAWINGS

FIG. 4 is a diagram schematically illustrating a mapping table.

FIGS. 6(a) and 6(b) are conceptual diagrams illustrating data-write to an external storage device virtualized as an internal volume.

FIGS. 8(a) and 8(b) are conceptual diagrams illustrating data-read from an external storage device virtualized as an internal volume.

FIG. 13 is a control table for determining error details in a storage device.

FIG. 14 is a control table for determining command stop times.

FIG. 15 is a control table showing values to be subtracted for threshold modification based on the alternate path structure.

FIG. 16 is a control table for determining delay times for delaying command responses.

DETAILED DESCRIPTION OF PREFERRED EMBODIMENT

An embodiment of the present invention will be described below. In a typical storage control system described below, a logical volume is set in a first storage controller. A logical volume in a second storage controller that exists outside the first storage controller is linked (mapped) to the logical volume in the first storage controller so that the first storage controller provides, to a host device, the storage area in the second storage controller as if it were a storage area in its own storage controller.

Figure 1:
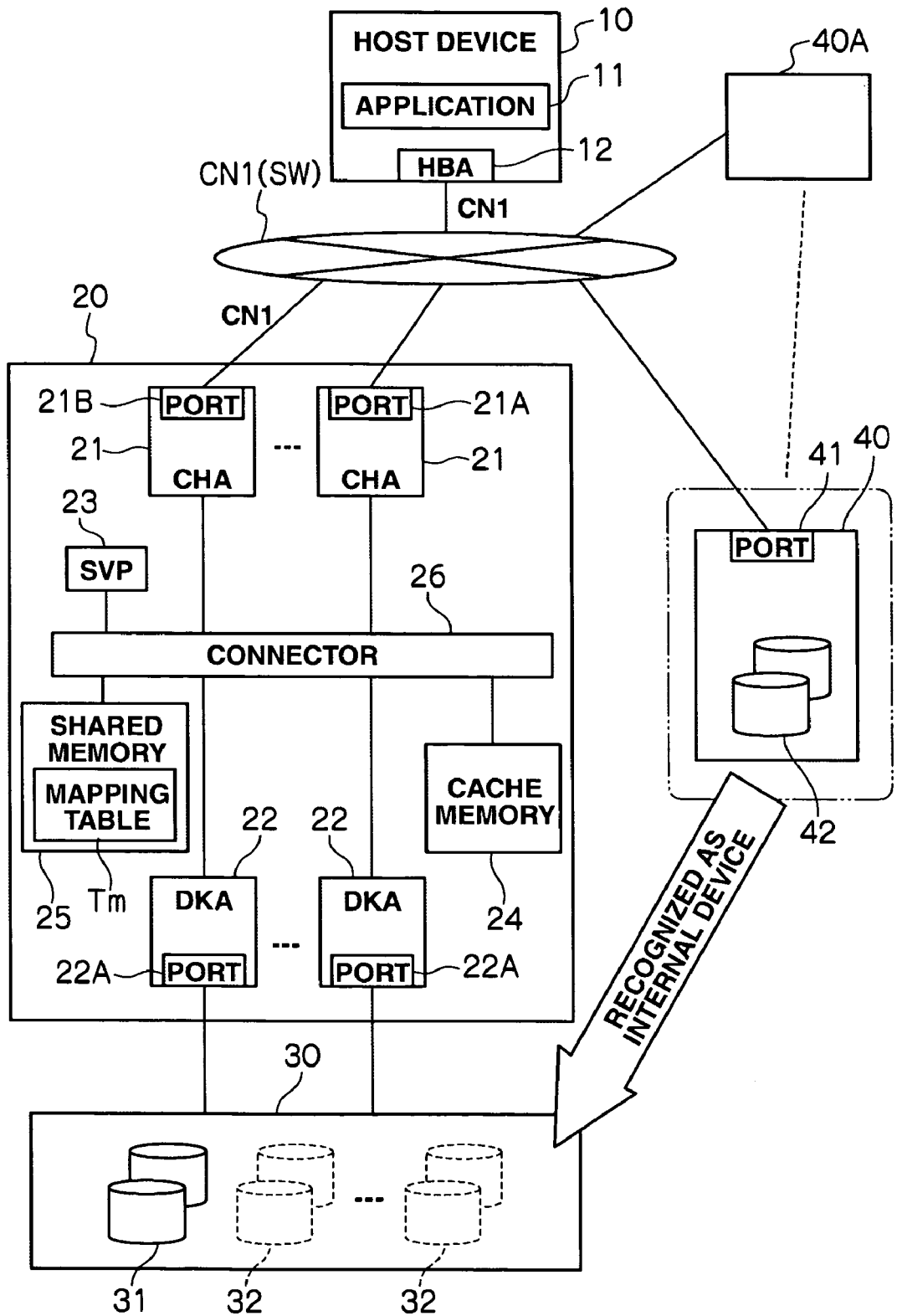
FIG. 1 is a block diagram showing the entire configuration of a storage system according to an embodiment of the present invention.

FIG. 1 is a block diagram showing the configuration of the main feature of the storage control system. A host device 10, being a host system, is a computer device such as a personal computer, a workstation, or a mainframe, having information processing resources such as a CPU (Central Processing Unit) and memory. The host device 10 includes information input devices (not shown) such as a keyboard, a switch or pointing device, and a microphone; and information output devices (not shown) such as a monitor display and a speaker. The host device 10 is also provided with an application program 11 such as database software that uses a storage area provided by a first storage controller 20; and an adapter 12 for accessing the first storage controller 20 via a communication network CN 1.

The host device 10 is connected to the first storage controller 20 via the communication network CN 1, which has a switch circuit SW. The communication network CN 1 may be a LAN, a SAN, the Internet, a dedicated line, or a public line, depending on the situation. Data communication via a LAN is performed using TCP/IP (Transmission Control Protocol/Internet Protocol). When the host device 10 is connected via a LAN to the first storage controller 20, it requests data input/output in files, by specifying the file name.

When the host device 10 is connected via a SAN to the first storage controller 20, it requests data input/output in blocks, blocks being data management units for the storage areas provided by a plurality of storage devices (disk drives), in accordance with Fibre Channel Protocol. If the communication network CN 1 is a LAN, the adapter 12 is a LAN-compliant network card. If the communication network CN 1 is a SAN, the adapter 12 is a host bus adapter.

The switch circuit SW has a router and an exchanger connected to the communication network. The switch circuit SW is configured so that at least one of ports 21A to 21B in the first storage controller 20 can be connected to a target port 41 in the second storage controller 40. The first storage controller 20 is set up as a disk array subsystem. As described later, the first storage controller 20 provides, to the host device 10, a storage resource that the second storage controller 40 has as its own logical volume.

The first storage controller 20 can be divided broadly into a controller section and a storage device section. The controller section includes a plurality of channel adapters (CHAs) 21; a plurality of disk adapters (DKAs) 22; a service processor (SVP) 23; a cache memory 24; a shared memory 25; and a connector 26.

The channel adapters (CHAs) 21 are designed to perform data communication with the host device 10. The channel adapters 21 perform data communication with an internal logical volume in the second storage controller 40 via an external port 21A in the first storage controller and a target port 41 in the second storage controller. Each channel adapter 21 is a microcomputer system having a microprocessor and memory, and interprets and executes various commands received from the host device 10. A network address (e.g. an IP address or WWN) for identifying each channel adapter 21 is allocated to each channel adapter 21, so that each channel adapter 21 can act individually as NAS (Network Attached Storage). When there is a plurality of host devices 10, a channel adapter 21 is provided to each host device and each request from those host devices can be received separately.

Each disk adapter (DKA) 22 is designed to perform data transmission to/from the storage devices 31 and 32 in a storage unit 30. The disk adapter 22 has a communication port 22A to be connected to the storage devices 31 and 32. The disk adapter 22 is a microcomputer system having a microprocessor and memory. The disk adapter 22 writes data that the channel adapter 21 has received from the host device 10 to a predetermined address in a predetermined storage device 31 or 32, based on a request (write command) from the host device 10; and reads data from a predetermined address in a predetermined storage device 31 or 32, based on a request (read command) from the host device 10 and transmits the data to the host device 10. When data input/output is performed with the storage devices 31 and 32, the disk adapter 22 converts logical addresses into physical addresses. When the storage devices 31 and 32 are managed by RAID, the disk adapter 22 performs data access in accordance with the relevant RAID configuration.

The service processor (SVP) 23 is designed to control the operation of the entire apparatus. The SVP 23 is connected to a management client (not shown). The SVP 23 monitors failure occurrence in the apparatus and instructs the management client to display failure reports, and instructs processing for blocking out storage disks based on the commands from the management client. The management client connected to the SVP 23 executes processing for defining a virtual logical volume, as described later. In the management client, a management program is installed on a JAVA (registered trademark) applet.

The cache memory 24 is designed to temporarily store data received from the host device 10 and data-read from the storage devices 31 and 32. The shared memory 25 stores control information used for operations in the first storage controller. In the shared memory 25, a work area is set and various tables such as a mapping table Tm, described later, are also stored. The cache memory 24 and the shared memory 25 can be separated memory, or it is also possible to used part of the storage area in a single memory as a cache area and use the remaining area as a control area. Alternatively, any one or a plurality of storage devices 31 and 32 may be used as a cache disk.

The connector 26 mutually connects each channel adapter 21, each disk adapter 22, the SVP 23, the cache memory 24, and the shared memory 25. The connector 26 may be a high-speed bus such as an ultrahigh-speed cross bus switch that performs data transmission with a high-speed switching operation.

The storage unit 30 includes a plurality of storage devices 31. The storage device 31 may be a hard disk, a flexible disk, a magnetic disk, a semiconductor memory, or an optical disk. Also, various kinds of disks, such as FC (Fibre Channel) disks and SATA (Serial AT Attached) disks may be used in the one storage unit 30. The storage device 32 shown with a dotted line within the storage unit 30 is a storage device 42 in the second storage controller 40 linked to the first storage controller 20. That is, the first storage controller 20 provides storage resources of an external storage device 42 to the host device 10 so that the host device can recognize the storage device 42 that exists outside the first storage controller 20 as an internal storage device in the first storage controller 20. For example, as described later, logical volumes in the second storage controller 40 is mapped onto a virtual logical volume, which is an intermediate logical storage area in the first storage controller 20. The virtual logical volume is configured by utilizing storage space in the cache memory 24. The virtual logical volume formed in the first storage controller 20 is recognized by the host device 10 together with the actual logical volume in the first storage controller 20.

The second storage controller 40 includes a communication port (target port) 41 and a storage device 42. It may also include a channel adapter and a disk adapter, and other components. The second storage controller 40 is connected via the switch circuit SW to the first storage controller 20. The storage device 42 in the second storage apparatus 40 is handled as an internal storage device in the first storage controller 20. A plurality of external storage controllers 40A can be connected to the switch circuit SW. Alternatively, they can be directly connected to the first storage controller 20 without the switch circuit SW.

Figure 2:
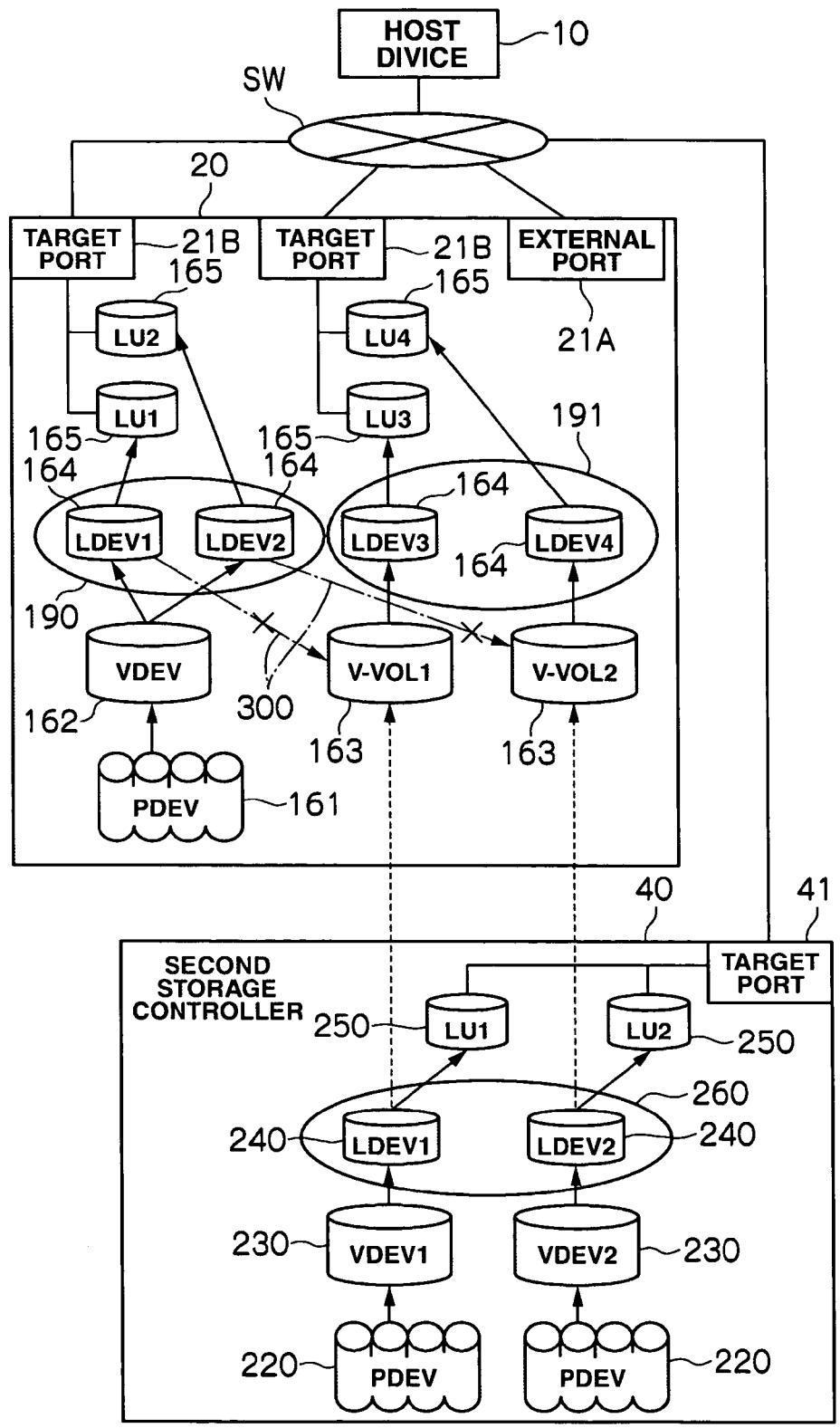
FIG. 2 is a schematic diagram showing a logical configuration of a storage system.

Next, FIG. 2 will be described. FIG. 2 is a schematic diagram showing an example of a logical configuration relating to storage control in the first and the second storage controllers 20 and 40. First, the configuration of the first storage control apparatus will be described. The storage configuration in the first storage controller can be divided broadly into a physical memory hierarchy and a logical memory hierarchy. The physical memory hierarchy is formed by PDEVs (Physical Devices) 161. The PDEVs are the disk drives.

The logical memory hierarchy can be configured by a plurality of (e.g. two kinds of) levels. One level of the logical memory hierarchy can be a VDEV (Virtual Device) 162 and a virtual volume (hereinafter referred to as "V-VOL") 163 handled in the same manner as the VDEV 162. The other stage of the logical hierarchy can be a LDEV (Logical Device) 164.

The VDEV 162 is formed by a group of a predetermined number of PDEVs 161, e.g. a group of four PDEVs (3D+1P) or of eight PDEVs (7D+1P). Storage areas provided by the PDEVs 161 belonging to the group are gathered to form one RAID storage area, which forms the VDEV 162.

The VDEV 162 is configured on a physical storage area. In contrast, the V-VOL 163 is a virtual intermediate storage device that does not need a physical storage area. The V-VOL 163 is not directly related to the physical storage area, but is a virtual entity to provide a basis for mapping LUs (Logical Units) 250 in the second storage controller 40.

At least one LDEV 164 may be set on the VDEV 162 and the V-VOL 163. The LDEV 164 can be formed by, e.g. dividing the VDEV 162 into units with a fixed length. When the host 10 is an open host, it recognizes the LDEV 164 as a physical disk by the LDEV 164 being mapped onto the LU 165. An open host accesses a desired LDEV 164 by specifying a LUN (Logical Unit Number) or a logical block address. A mainframe host directly recognizes the LDEV 164.

The LU 165 is a device that can be recognized as an SCSI logical unit. Each LU 165 is connected via the target port 21B to the host 10. The LU 165 can be linked to at least one LDEV 164. The LU size can be expanded virtually by linking one LU 165 to a plurality of LDEVs 164.

An external port 21A for external connection of the first storage controller 20 can be connected via the switch circuit SW to the target port 41 in the second storage apparatus 40 or the target port 21B in the first storage controller 20.

The second storage controller 40 includes a plurality of PDEVs 220; VDEVs 230 set on a storage area provided by the PDEVs 220; and at least one LDEV 240 that can be set on the VDEVs 230. Each LDEV 240 is linked to the LU 250.

In this embodiment, the LU 250 (namely, the LDEV 240) in the second storage controller 40 is mapped onto a virtual logical volume V-VOL 163, which is a virtual intermediate storage device, and handled as an internal logical volume in the first storage controller 20.

For example, "LDEV 1" and "LDEV 2" in the second storage controller 40 are mapped respectively, via "LU 1" and "LU 2," onto "V-VOL 1" and "V-VOL 2" in the first storage controller 20. "V-VOL 1" and "V-VOL 2" are mapped respectively onto "LDEV 3" and "LDEV 4" and are available via "LU 3" and "LU 4."

The RAID configuration is applicable to the VDEV 162 and V-VOL 163. That is, it is possible to allot one disk drive

161 to a plurality of VDEVs 162 and V-VOLs 163 ("slicing"), or to form one VDEV 162 or V-VOL 163 with a plurality of disk drives 161 ("striping").

The "LDEV 1" and "LDEV 2" in the first storage controller 20 are the internal logical volume 190. The "LDEV 3" and "LDEV 4" in the first storage controller 20 are the virtual logical volume 191. The "LDEV 1" and "LDEV 2" in the second storage controller 40 are the external logical volume 260. The internal logical volume 190 is set based on physical storage devices (e.g. disk drives) provided in the first storage controller 20. The virtual volume 191 is a virtual entity, and the entity that actually stores the data is in the second storage controller 40. In other words, the virtual logical volume 191 is configured so that the external volume 260 in the second storage controller 40 is mapped onto a predetermined stage of the memory hierarchy in the first storage controller 20.

Referring to FIG. 1, the CHA 21 in the first storage controller 20 recognizes a volume that can be referred to from the external port 21A as an external device, and defines the above-described virtual logical volume mapped onto this external storage device in the first storage controller 20. The defining operation is performed by a JAVA (registered trademark) applet on a management client of the SVP 23. The definition information is stored as a mapping table Tm in the shared memory 25. As shown with the reference number 300 in FIG. 2, the virtual logical volume cannot be mapped onto the internal logical volume 190 in the first storage controller.

Figure 3:
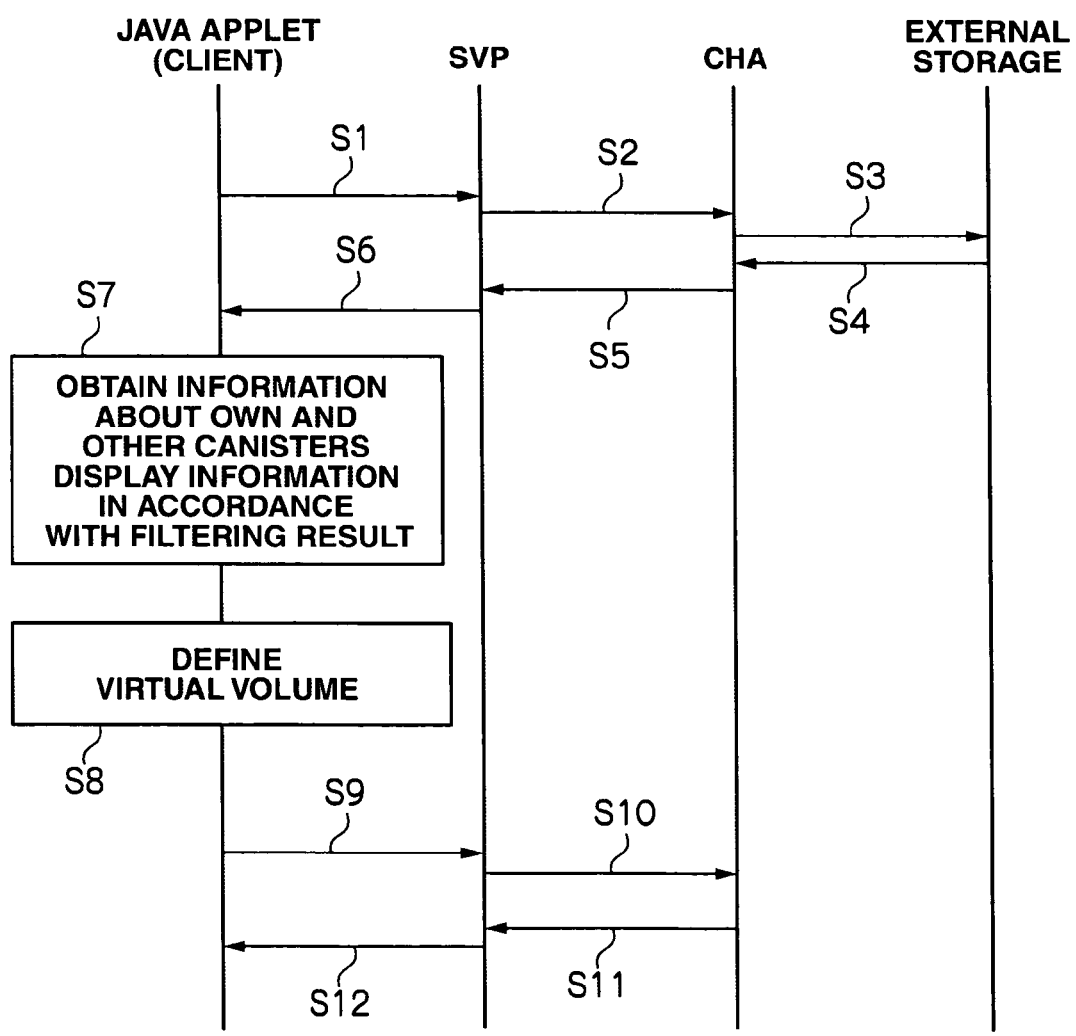
FIG. 3 is a diagram showing an operation flow for setting a virtual logical volume.

Next, the operation for setting the virtual logical volume on the first storage controller 20 will be described. FIG. 3 shows the flow of the setting operation. The JAVA (registered trademark) applet on the management client requests that the SVP acquires internal logical volume information ("discovery") that can be referred from the external port 21A (FIG. 1) (S1). The SVP receiving this request commands the CHA 21 (FIG. 1) in the first storage controller to execute the "discovery" (S2). The CHA obtains an IP address of the switch circuit SW by referring to the shared memory 25 to access to the switch circuit SW via the external port 21A, and acquires information about all the volumes that can be referred from the switch circuit. Namely, the CHA acquires the information about the virtual logical volumes connectable to the external port 21A without discriminating between the internal logical volume in its own canister and that in another storage controller (S3). As shown in FIG. 1, the volumes that the CHA 21 can refer to via the switch circuit SW connected to the external port 21A are logical volumes in the first and second storage controllers 20 and 40.

Next, the CHA 21 in the first storage controller 20 and a CHA (not shown) in the second control apparatus 40 refer respectively to their shared memories and obtain the data on the properties of the respective internal logical volumes (S4). The CHA 21, having obtained the property data, transmits this data via the SVP 32 to the JAVA (registered trademark) applet, which is the management client (S5 and S6). On the JAVA (registered trademark) applet, a storage management application is installed that checks whether the canisters that contain the internal logical volumes referred to in the "discovery" extracted from the information including "storage vender's name, manufacture type, manufacture number" in the property data, is in the storage controller that the CHA 21 belongs to or in an external storage controller.

The management application includes a module that performs filtering, or checks whether or not each internal logical volume extracted by the "discovery" is suitable for a candidate for the above-described virtual logical volume. The management application performs filtering on the extracted information about each of the logical volumes using the filtering module (S7), and performs image processing for displaying the logical volumes meeting the relevant conditions as a candidate group to be mapped onto the virtual logical volume.

In this embodiment, as described above, the management application is programmed so that the internal logical volumes in the first storage controller 20 are not displayed as the candidate group to be mapped onto the virtual logical volume. Next, the management client requests that the SVP executes the processing for defining the virtual logical volume (S8 and S9). The SVP makes the CHA execute the virtual logical volume defining processing, i.e, processing for producing the above-described mapping table (S10), receives the processing result, and transmits it to the management client (S11 and S12). Since the internal logical volumes in its own canister (the first storage controller 20) are not displayed as those mapped onto the virtual logical volume in its own canister, a management client user cannot set the virtual logical volume on the internal logical volume in its own canister.

Accordingly, the data update request sent from the host device 10 to the virtual logical volume affects the actual logical volume and the data content in the actual logical volume being updated although the data update is not required to the actual logical volume can be avoided. It should be noted that the virtual logical volume setting controller described in the claims can be realized by the SVP and the management client. This setting control processing can also be realized by the CHA or a processor in the DKA.

Filtering conditions can be changed by the management client when necessary. The management client can also cancel the filtering conditions and display all logical volumes for which a path is formed on the external port in the first storage controller.

The "discovery" is executed appropriately when power is applied to the first storage controller, or when the host accesses the first storage apparatus, or at a predetermined time. The information about the logical volume obtained as a result of the "discovery" is stored in the shared memory every "discovery" operation. From the viewpoint of efficient use of a memory resource in the shared memory, the management client contains a software module that erases past acquired information and executes the "discovery" again. The management client can check whether the information is about the volume in its own canister or the volume in another canister (the second or subsequent storage controller) by comparing the information about properties of the logical volume obtained as a result of the "discovery" with the reference information stored in the shared memory.

Next, processing for defining the virtual logical volume will be described in detail. FIG. 4 shows an example of the structure of the above-described mapping table Tm. The mapping table Tm contains the VDEV number for specifying the VDEV and the corresponding external storage device information. The external device information includes, for example: device identification information; the storage capacity of the storage device; device type information (e.g. tape-type or disk-type device); and information about a device path. The path information includes identification information (WWN) specific to the respective communication ports (21A and 21B in FIG. 1) and LU numbers for identifying the LUs in FIG. 2.

The device identification information and the WWNs shown in FIG. 4 are random values for the description and do not have special meanings. The VDEV with the VDEV number "3" shown in the lower part of FIG. 4 is linked to the information on three paths. That is, the external storage device (reference number 42 in FIG. 1) mapped onto the VDEV (#3) has an alternate path structure having three paths therein, and is mapped onto the VDEV, and the mapping is conducted recognizing the alternate paths. Because it is clear that the same storage area can be accessed via any of those three paths, desired data can be accessed via the remaining normal path even when a failure occurs in any one or two of the three paths. By utilizing the mapping table Tm shown in FIG. 4, one or a plurality of external storage device(s) 42 can be mapped onto one or more VDEV(s) in the first storage controller 20.

Figure 5:
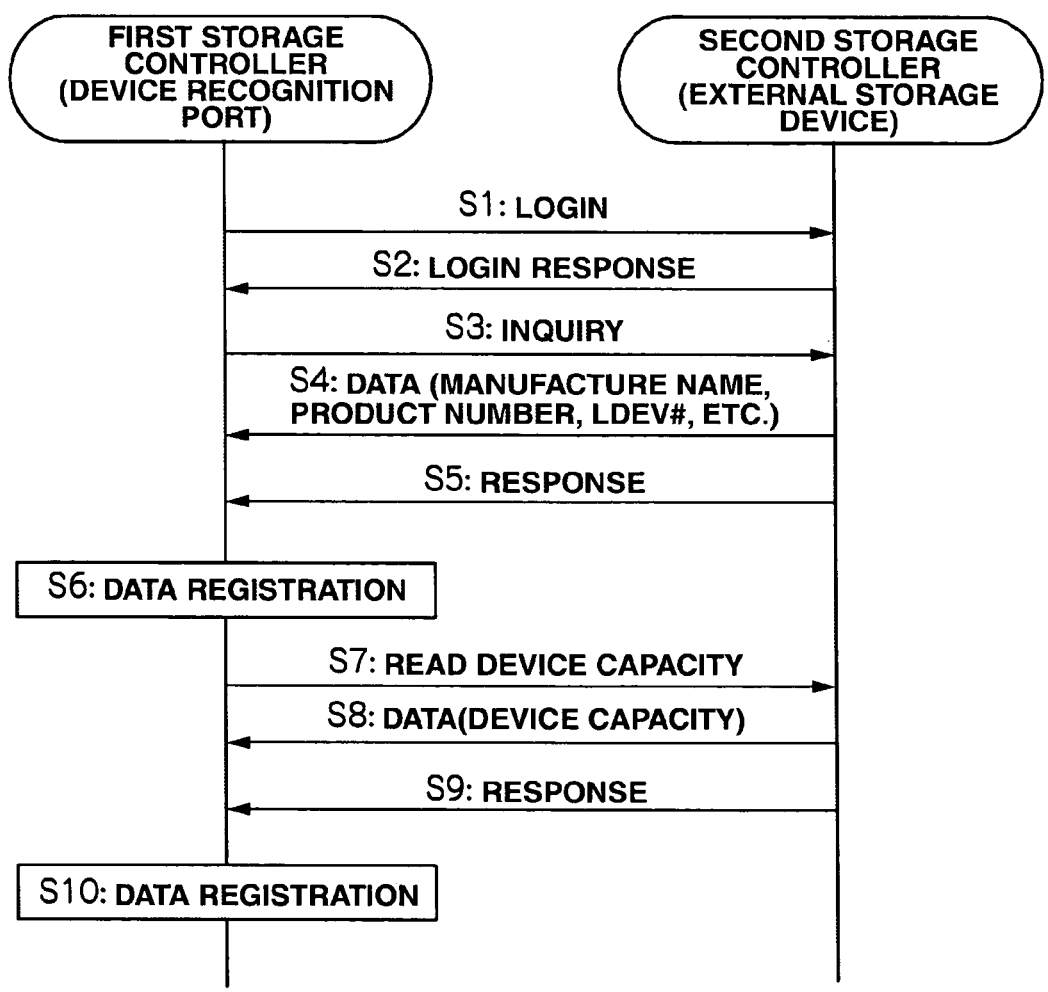
FIG. 5 is a diagram showing a processing flow for producing a mapping table.

Next, an example of a method for mapping the external storage device 42 onto the VDEV 101 will be described with reference to FIG. 5. FIG. 5 is a time chart showing the main feature in the processing performed between the first and second storage controllers 20 and 40 during the mapping. First, the first storage controller 20 commences login to the second storage controller 40 from the external port (21A) in the channel adapter 21 via the switch circuit SW (S1). The login is completed by the second storage controller 40 responding to the login by the first storage controller 20 (S2). Next, the first storage controller 20 transmits an inquiry command based-on, e.g. the SCSI (Small Computer System Interface) standard to the second storage controller 40, requesting a response regarding the details of the storage device 42 that the second storage controller 40 has (S3). This operation is the same as the above-described "discovery" operation.

The inquiry command is used for clarifying the type and configuration of the apparatus receiving the inquiry, and the physical configuration of the apparatus receiving the inquiry can be understood from its memory hierarchy. By using the inquiry command, the first storage controller 20 can obtain information containing things like the apparatus name, the device type (e.g. FC drive or ATA drive), the product number (product ID), the LDEV number, various version information, and the vender ID (S4). The second storage controller 40 transmits the relevant information to the first storage controller, and makes a reply (S5). The information extracted in the "discovery" is stored in the shared memory. The CHA may omit steps S3 to S5 by utilizing the stored information.

The first storage controller 20 registers the information obtained from the second storage controller 40 in predetermined portions in the mapping table Tm (S6). Next, the first storage controller 20 reads the storage capacity of the storage device 42 from the second storage controller 40 (S7). The second storage controller 40 sends back the storage capacity of the storage device 42 in response to the inquiry from the first storage controller 20 (S8) and makes a reply (S9). The first storage controller 20 registers the storage capacity of the storage device 42 in a predetermined portion in the mapping table Tm (S10).

The mapping table Tm is configured through the above processing. When the data input/output is performed with the external storage device 42 (the external LUN, namely the external LDEV) mapped onto the VDEV in the first storage controller 20, the address conversion and related operations are performed by referring to other tables, described later.

Figure 7:
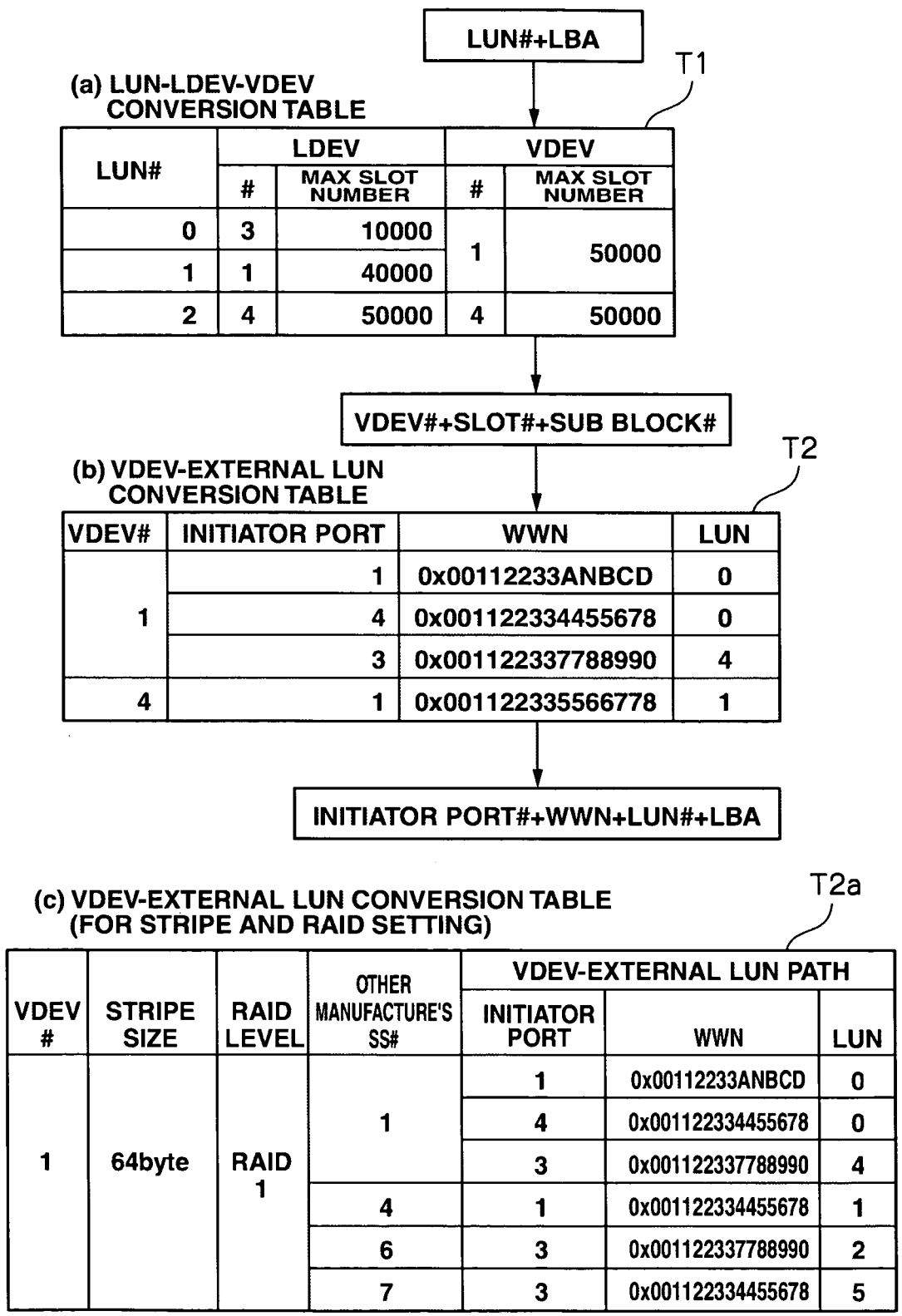
FIGS. 7(a) to (c) are diagrams schematically illustrating address conversion for write data.

Data input/output between the first and second storage controllers 20 and 40 will be described with reference to FIGS. 6 to 8. First, data-write will be described based on FIGS. 6 and 7. FIG. 6 is a schematic diagram showing processing for data-write. FIG. 7 is a diagram illustrating the flow of the processing in FIG. 6 in relation to various tables.

The host device 10 can write data to a logical volume (LDEV 102) provided by the first storage controller 20. For example, the host device 10 is set so that it can access only to a specific LDEV 102 by means of methods such as "zoning," in which a virtual SAN subnet is set in a SAN, or "LUN masking," in which the host device 10 keeps a list of accessible LUNs.

When the LDEV 102, that the host device 10 is about to write the data to, is connected via the VDEV 101 to the storage device 31, being an internal storage device, data is written via regular processing. That is, the data from the host device 10 is temporarily stored in the cache memory 24, and then transferred from the cache memory 24, via the disk adapter 22, to a predetermined address in the predetermined storage device 31. The disk adapter 22 converts logical addresses into physical addresses. In the RAID configuration, the same data is stored in a plurality of storage devices 31.

On the other hand, when the host device 10 is about to write data to the LDEV 102 connected via the VDEV 101 to an external storage device 42, the data is written in the manner shown in FIG. 6. FIG. 6(a) shows the data flow based on the memory hierarchy, and FIG. 6(b) shows the data flow based on usage of the cache memory 24.

The host device 10 issues a write command ("Write"), clearly specifying the LDEV number identifying an LDEV 102 that the data is written to and the WWN identifying a communication port 21A used to access this LDEV 102 (S21). When the first storage controller 20 (a processor in CHAs) receives the write command from the host device 10, it generates and transmits a write command to the second storage controller 40 (S22). The first storage controller 20 generates a new write command by changing the write address information in the write command received from the host device 10 to match the external LDEV 43.

Next, the host device 10 transmits the write data to the first storage controller 20 (S23). The data received by the first storage controller 20 is transferred via the LDEV 102 and VDEV 101 (S24), to the external LDEV 43(26). Usually, the first storage controller 20 makes a reply to the host device 10 ("Good") indicating completion of data-write when it stores the data from the host device 10 to the cache memory 24 (S25). When the second storage controller 40 receives the data from the first storage controller 20 (or finishes writing the data to the storage device 42), it transmits a write-completion report to the first storage controller 20 (S27). The first storage controller 20 reports the end of data-write to the host device 10 (S25) and the data is actually stored in the storage device 42 at different timings (asynchronous method). Accordingly, the host device 10 is released from the data-write processing before the data is actually stored in the storage device 42, and so it can perform other processing, such as issuing a next command.

As shown in FIG. 6(b), the cache memory 24 is provided with a number of sub-blocks 24A. The first storage controller 20 converts a logical block address specified by the host device 10 into a sub-block address and stores the data in a predetermined portion in the cache memory 24 (S24).

The data conversion utilizing various tables will be described with reference to FIG. 7. As shown in the upper part of FIG. 7, the host device 10 transmits data to a predetermined communication port 21A, specifying the LUN (LUN#) and logical block address (LBA). The first storage controller 20 converts data (LUN#+LBA) input for the LDEV 102 into data for the VDEV 101 based on the first conversion table T1 shown in FIG. 7(a).

A first conversion table T1 is an LUN-LDEV-VDEV conversion table for converting data specifying an internal LUN 103 into data for a VDEV 101. The table T1 contains, for example: the LUN (LUN#); the LDEV number (LDEV#) and the maximum slot number of the LDEV 102 that corresponds to the LUN 103; and the VDEV number (VDEV#) and the maximum slot number of the VDEV 101 that corresponds to the LDEV 102. The data from the host device 10 (LUN#+LBA)is converted into data for the VDEV 101 (VDEV#+SLOT#+SUBBLOCK#) with reference to the table T1.

Next, the first storage controller 20 refers to a second conversion table T2 shown in FIG. 7(*b*) to convert the data for the VDEV 101 into data to be transmitted to and stored in the external LUN (LDEV) in the second storage controller 40. The second conversion table T2 contains, for example: the VDEV 101 number (VDEV#) of the VDEV 101; the initiator port number for transmitting data from the VDEV 101 to the second storage controller 40; the WWN for specifying the communication port 41 that the data is transferred to; and the LUN accessible via this communication port. The first storage controller 20 converts the information about the address where the data is stored into information in an "initiator port (target port) number#+WWN+LUN#+LBA" format, based on the second conversion table T2.

The data with the converted address information reaches the specified communication port 41 from the specified initiator port via the communication network CN1, and is stored in a predetermined portion in the LDEV that is accessible via the specified LUN 43. Since the LDEV is virtually configured on a plurality of storage devices 42, the data address is converted into a physical address and the data is stored in a predetermined address in a predetermined disk.

FIG. 7(*b*) shows another second conversion table T2*a*. This conversion table T2*a* is used when the striping or RAID is applied to the VDEV 101 deriving from the external storage device 42. The conversion table T2*a* contains: the VDEV number (VDEV#); the stripe size; the RAID level; the number for specifying the second storage controller 40 (SS#: Storage System number); the initiator port number; the WWN of the communication port 41; and the LUN number of the LUN 43.

The flow of data-read from the LDEV in the second storage controller 40 will be described with reference to FIG. 8. First, the host device 10 transmits a data-read command to the first storage controller 20, specifying the communication port 21A (S31). When the first storage controller 20 receives the read command, it generates a read command to read the requested data from the second storage controller 40. The first storage controller 20 transmits that read command to the second storage controller 40 (S32).

The second storage controller 40 reads the requested data from the storage device 42 in response to the read command received from the first storage controller 20, transmits the data to the first storage controller 20 (S33), and reports that the data-read has been properly completed (S35). The first storage controller 20 stores the data received from the second storage controller 40 in a predetermined portion in the cache memory 24, as shown in FIG. 8(*b*) (S34).

The first storage controller 20 reads the data stored to the cache memory 24, performs address conversion, then transmits the data via the LUN103 to the host device 10 (S36), and reports the completion of the data-read (S37). The flow of the processing in data-read is performed in reverse order to that of the conversion operation described above with reference to FIG. 7.

In FIG. 8, the data is read from the second storage controller 40 and stored in the cache memory 24 in response to the request from the host device 10. However, without being limited to this method, all or part of the data stored in the external LDEV may be stored in advance to the cache memory 24. In this case, data can be immediately read from the cache memory 24 in response to the read command from the host device 10 and transmitted to the host device 10.

Figure 9:
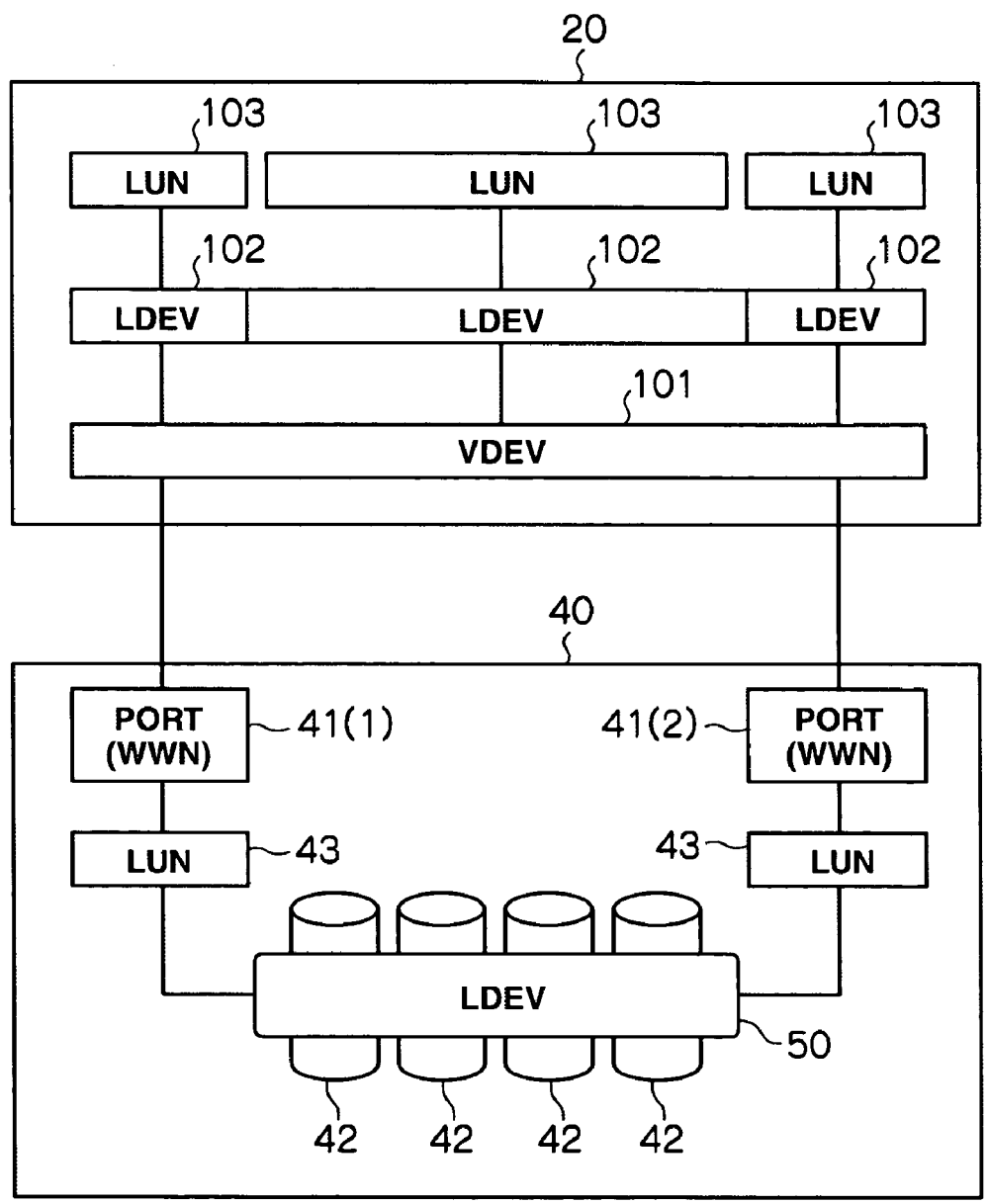
FIG. 9 is a block diagram showing an alternate path structure.

FIG. 9 indicates that the LDEV provided by the storage device 42 in the second storage controller 40 has alternate pass structure with a plurality of paths. That is, the LDEV 240, being a logical volume, is formed on each storage apparatus 42 (220), and the first storage controller can access this LDEV via two access data paths. One path leads to the LDEV 240 from the first communication port 42(1) via the LUN 250, and the other path leads to the LDEV 240 from the second communication port 41(2) via another LUN 250. Accordingly, the first storage controller can access the LDEV in the second storage controller even when either of the paths becomes unavailable because of a failure. With this alternate path structure, the redundancy of the first storage controller is improved.

In the above descriptions, when the host device writes data to a logical volume in the second storage controller, the first storage controller 20 makes a replay reporting completion of data-write ("Good") to the host device 10 at the point in time when storing the data from the host device 10 to the cache memory 24, as shown in FIG. 6(*b*). If the response performance of the storage device 42 (220) in the second storage controller is poor, namely when the data writing speed to the external storage device 42 is slow; the second storage controller is in a busy state because it is executing another processing, such as a command from the host device connected to the second storage controller; or a failure is occurring in the communication system to the external storage device, dirty data that has not yet been stored in the storage device may accumulate in the cache memory even though the first storage controller has made a response reporting the writing completion response to the host device.

In that case, the storage capacity in the cache memory for the data to be stored in other storage devices is overloaded, and data cannot be written to other storage devices. Since the second storage controller is an additional storage controller, it uses a storage device with inferior response performance, such as an ATA drive. The response performance of an ATA drive, e.g. a sATA drive is inferior to that of a FC drive. Moreover, unlike the hard disks in the first storage controller, the external storage device is connected to the first storage controller with a cable. So, there is the possibility of a cable failure.

In the embodiment described below, a controller (a microprocessor in the CHA 21) in the first storage controller 20 initially sets an amount (hereinafter referred to as "threshold value") in the cache memory 24 assigned to each of the storage devices 42 in the second storage controller 40 when producing the mapping table in FIG. 4. Next, the microprocessor modifies the threshold value based on the state of each storage device, and executes an operation to avoid having the storage resources of the cache memory being filled with dirty data when the memory usage amount in the cache memory for each storage device exceeds or gets close to the threshold value. Various methods are available for this operation. A method different from one shown in FIG. 6(*b*), i.e. on where the microprocessor writes the data to the external storage device without using the cache memory ("write-through cache"); and a method where the host device does not issue a write command or reduce the frequency of issuing write commands to the microprocessor are two examples.

Figure 10:
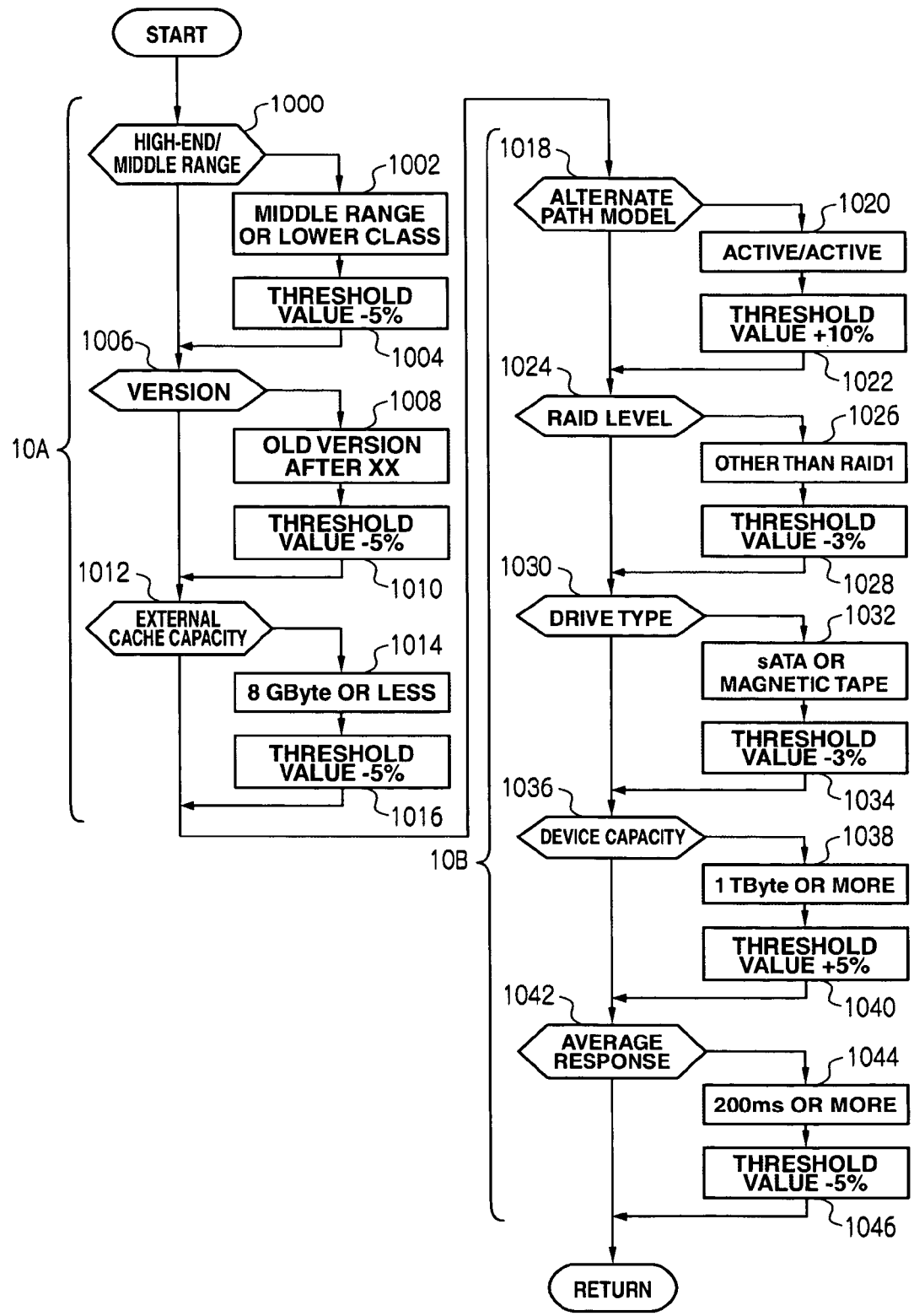
FIG. 10 is a flowchart for determining an allocated amount (threshold) for the storage capacity in a cache memory assigned to a storage device.

FIG. 10 is a flowchart of processing executed by the microprocessor for determining the threshold value when a new storage device 42 in the external storage controller 40 is connected to the first storage controller. This flowchart is contained in a local memory (not shown) in the CHA 21. The flowchart includes a part 10A determining the threshold value in accordance with the type and performance of the external storage, and a part 10B determining the threshold value in accordance with device properties such as the device type. The threshold value is determined by changing or modifying the initial value in the 10A and 10B processes. The threshold value is defined by the usage amount in the cache memory, and is a ceiling amount for the storage capacity in the cache memory for a particular storage device.

The microprocessor begins the flowchart shown in FIG. 10 when it detects a new storage device 42 in the second storage controller 40. The microprocessor checks in step 1000 whether the second storage controller is in a high-end class with high storage control processing speed, or middle or lower range class. The microprocessor can perform this check by obtaining the apparatus information about the second storage controller and comparing it with the information pre-stored in the shared memory 25. In step 1000, if the second storage controller is middle or lower range class, the threshold value is set to a value after subtracting 5% from the initial storage amount (initial value) of the cache memory for the new device (steps 1002 and 1004). The initial value for the new device is decided by evenly dividing the storage capacity of an entire predetermined area in the cache memory according to the number of external devices.

Next, if the second storage apparatus is high-end class, the version of the storage controller is checked in step 1006. If the version of the storage controller is old, the threshold is set to a value after subtracting 5% from the storage capacity assigned to the new storage device (steps 1008 and 1010). If the apparatus is middle or lower range class in step 1000, a total of 10% is subtracted from the initial value in steps 1000 and 1002.

In step 1012, the storage capacity of the cache memory in the second storage controller is checked. If the storage capacity of the cache memory is 8 GByte or less, including the apparatus not having a cache memory, the threshold value is further reduced by 5%. In steps 1000, 1006, and 1012, the properties of the second storage controller are evaluated. If the properties of the second storage controller are lower than the criteria presented in those steps, the response performance of the external storage device is affected. In that case, the threshold value is set to a smaller value to prevent the storage resources of the cache memory from being saturated.

Next, in step 1018, the alternate model for the device type is identified. There are several alternate models, one of which is "Active/Active." It is a type using all paths and performing the same processing in all those paths to balance the workload in all paths. Another one is "Active/Passive," being a type switching to another path when a failure occurs in a path transferring data. Still another one is "Active/Standby," in which a command is needed to switch to another path.

In step 1018, when the device type is Active/Active, the threshold value is incremented by 10% (steps 1020 and 1022). Here, the threshold value is incremented because the device has a high anti-failure property. Next, the RAID type of the storage device will be checked (step 1024). If the RAID level is anything other than RAID-1, the threshold value is reduced by 3%.

Next, the drive type is checked (steps 1030-1034). If the drive is a sATA or a tape device, the threshold value is reduced by 3%. After that, the capacity of the storage device is checked (steps 1036 to 1040). If the device capacity is 1 TByte or less, the threshold value is incremented by 5%. Then, the average response time of the device is checked. If the average response time is 200 ms or longer, the threshold value is reduced by 5%.

By undergoing the above steps, the threshold value is set when the external storage device is connected to the first storage controller according to the properties of the external storage device that the threshold value is about to be determined for and those of the external storage controller containing that device. So, if the storage device has good response performance with the first storage controller and a high anti-failure property, a high threshold value is set. In other words, because the possibility that the storage capacity of the cache memory will be overloaded is low, the amount of cache memory to be assigned to the external storage apparatus is set larger. On the other hand, if the response performance and anti-failure property of the external storage device is poor, the threshold value is set lower to prevent the storage capacity of the cache memory from being overloaded.

Figure 11:
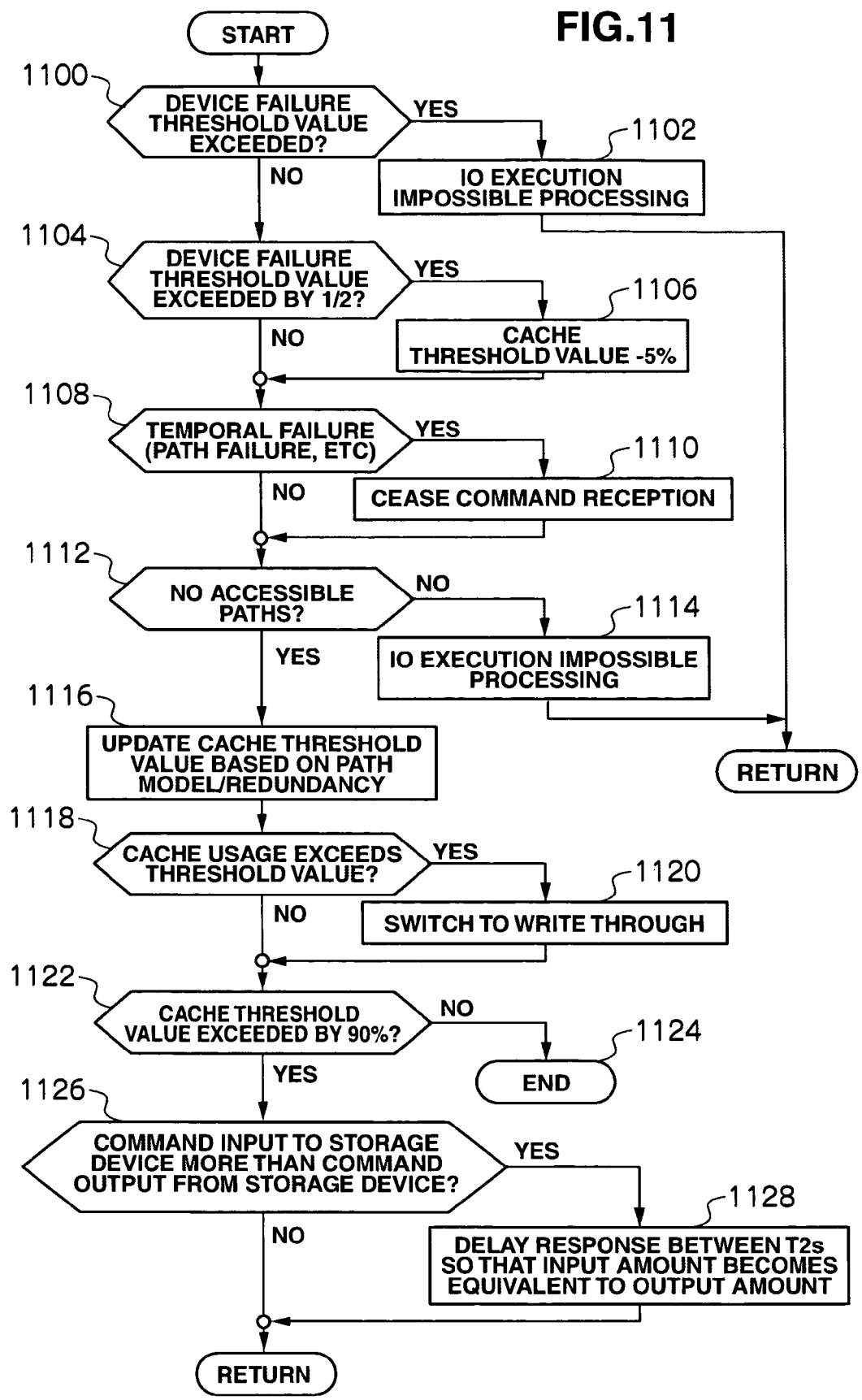
FIG. 11 is a flowchart for limiting a controller's access to a cache memory.

FIG. 11 is a flowchart of processing for preventing the capacity of the cache memory in the storage device that the host has issued data-write I/O to from being uselessly occupied while data that has not been reflected to the external storage device (dirty data) occupies an amount (40%) set by a user, or more, of the storage capacity in the cache memory 24 in the first storage controller. In the description for this flowchart, the applicant uses FIG. 12, in which the functional block diagram of the storage control system shown in FIG. 1 is simplified. However, the functional block diagram in FIG. 12 is partially different from that in FIG. 1.

Figure 12:
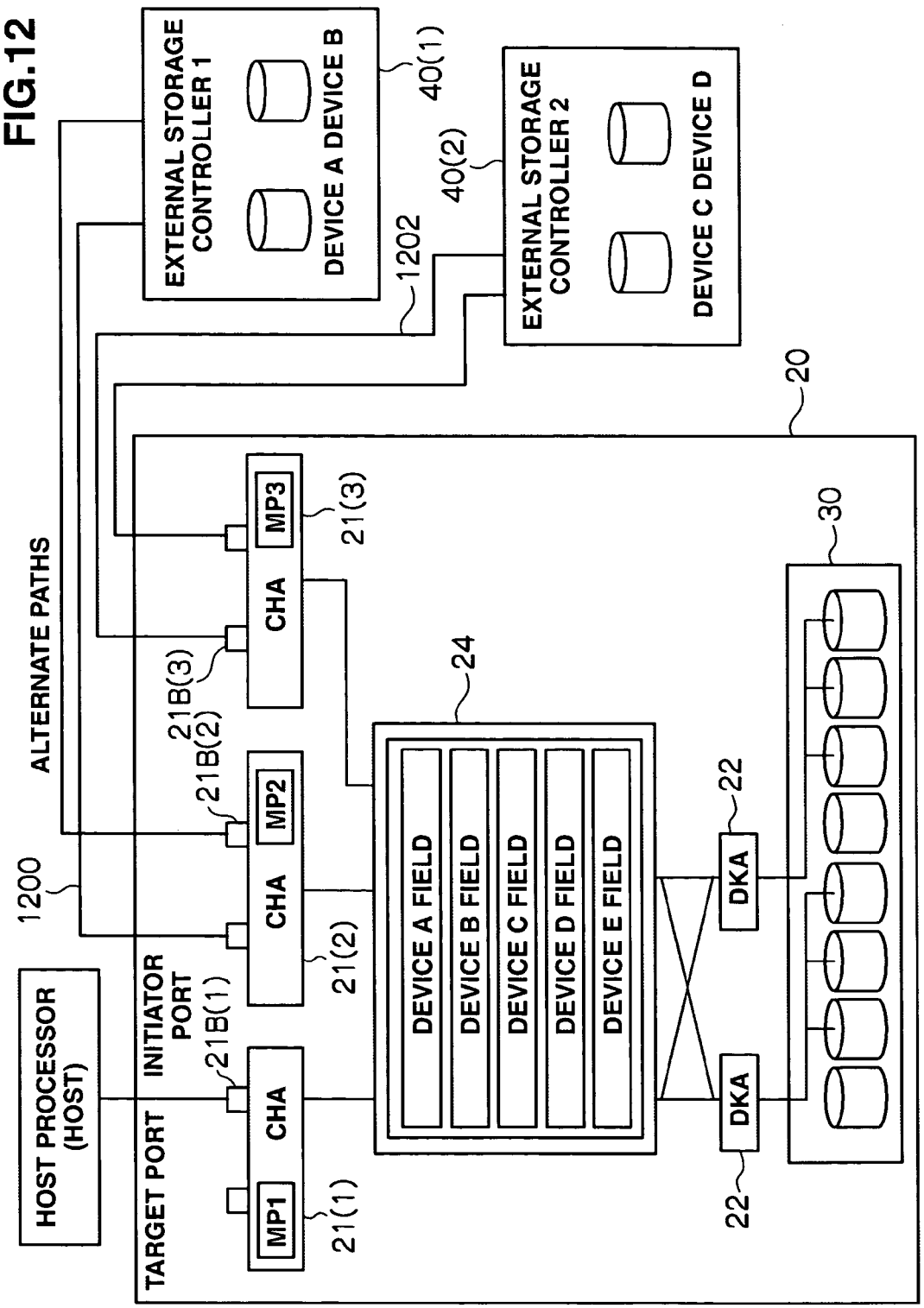
FIG. 12 is a functional block diagram simply showing the storage control system shown in FIG. 1.

In FIG. 12, the target port 21B(1) in the CHA 21(1) is connected to a host device. The initiator port 21B(2) in the CHA 21(2) is connected to an external storage controller 40(1). This external storage controller provides the storage devices A and B to the first storage controller 20 as internal logical volumes in the first storage controller 20. The initiator port 21(B) in the CHA 21(3) is connected to still another external storage controller 40(2). This external storage controller 40(2) provides storage devices C and D to the first storage controller as internal logical volumes in the first storage controller. The storage capacity of the cache memory 24 is assigned to each external storage device. The assigned storage capacity is the above-described threshold value. Each CHA includes a microprocessor (MP 1, MP 2, and MP 3) built-in. There are alternate paths between the first storage controller 20 and the storage devices A, B, C, and D. p The flowchart shown in FIG. 11 will be described with reference to FIG. 12. The microprocessor (MP2 or MP3) in the CHA in the first storage controller 20 checks whether or not dirty data occupies 40% or more of storage capacity in the entire cache memory 24. If the check result is YES, a dedicated flag is set in a predetermined area in the shared memory 25 or in a local memory (not shown) in the CHA. When this flag is set, the microprocessor begins the flowchart shown in FIG. 11 and repeatedly executes it until the flag is reset. The flowchart in FIG. 11 is performed on each external storage device. The microprocessor executes the flowchart in FIG. 11 on an external storage device whenever the host device issues I/O to the external storage device, or periodically (e.g. every 50 ms). Regarding a storage device that has not been issued the I/O, the microprocessor executes the flowchart in FIG. 11 at every fixed time (e.g. every 1 hour).

The following is the description of a storage device A shown in FIG. 12. The description is also applicable to storage devices B, C, and D in other external storage controllers. In step 1100 in FIG. 11, the microprocessor MP2 reads information about a failure in the external storage device A. This failure information contains the failure details and the integrated number of failures updated and is stored in a predetermined storage area in the local memory CHA 21(2) every time the microprocessor MP2 detects a device failure in an external storage controller.

FIG. 13 shows a control table showing the failure details defined based on SCSI Protocol. "Retry" means a command issued by the microprocessor MP2 to the storage device A to rewrite the data in the cache 24 to the external storage device A when the data-write cannot be performed. In a "USP" version of the first storage controller, the microprocessor MP2 determines that a "BUSY" failure is occurring in the external storage device when the number of retries reaches 64 (failure threshold) or more. In the storage controller a version other than "USP," it is determined that the same failure is occurring when the number of retries reaches 32. Other failures are determined by the microprocessor MP2 when the number of retries exceeds the threshold value shown in FIG. 13. When the number of errors (retries) exceeds the threshold value in an external storage device, the microprocessor determines this storage device to be a defective storage device and ceases I/O with this device (step 1102). The defective device is replaced with a normal one.

If the check result is NO in step 1100 and the number of errors in the storage device exceeds half of the threshold value shown in FIG. 13 in step 1104, a new threshold value for cache memory capacity is set by subtracting 5% from the threshold value determined in the flowchart in FIG. 10. In this manner, overload of the cache memory capacity, which might occur in the defective storage device A, in which an error is occurring in, can be prevented. If the check result in step 1104 is NO, the microprocessor MP2 goes on to step 1108 and checks whether any path failures, such as "link-down," have occurred between the first storage controller and the external storage devices.

If the check result is YES, the microprocessor MP2 goes on to step 1110 and suspends receiving commands from the host device. That is, the microprocessor MP2 generates a status message (e.g. "busy" or "check condition" in Fibre Channel Protocol) that commands from the host device cannot be received, and transmits the message to the microprocessor MP1 in the CHA 21(1) connected to the host device. Then, the microprocessor in the CHA 21(1) will not receive commands from the host device for a predetermined time (e.g. 1.0 second). Accordingly, because access to the external storage device A is suspended, usage of the cache memory 24 is reduced during this period, and further accumulation of dirty data for the external storage device A, in which a path failure is occurring in the cache memory 24, can be prevented. In this manner, dirty data accumulating in the cache memory 24 is preferentially written to the storage device A. The time period for suspending the reception of commands is determined by the microprocessor MP2 based on information about the external storage devices, such as the capacity of the cache memory assigned to the external storage device A (threshold value) and the class of the storage controller (high-end or middle range).

FIG. 14 is a control table defining a command reception suspension time. The control table is contained in a predetermined area in the above-described shared memory 25. FIG. 14 shows the ratio (%) of the amount of used memory in the cache memory to the threshold for the device A in the cache memory, and a command reception suspension time determined by the response time of the device A to the MP2. The figure shows that the command reception suspension time is longer as the usage ratio is larger and the response time is longer. When the usage ratio is 80% or more, the command reception suspension time is determined at less than the maximum host timeout time.

Next, whether or not there are any other accessible paths is checked in step 1112. If it is determined that there are no more accessible paths, the external storage device is decided as a defective device as in step 1102. If another accessible path is found in step 1112, the microprocessor updates the threshold values to a value defined by path model/redundancy (the number of paths) and storage capacity (% with respect to the entire capacity) that the external storage device can occupy in the cache memory, based on the control table in FIG. 15 (step 1116).

In step 1118, the microprocessor MP2 compares the threshold value updated in step 1116 with the amount of memory in the cache memory used for the storage device A. If the latter value is larger than the former, the storage method for the storage device is switched to the "write-through cache" method (step 1120). The "write through" method is a method where the microprocessor reports the data-write completion to the host device when the data-write to the storage device is completed. Usually, the microprocessor sends back the data-write completion report (S25) to the host device at the point in time when the data from the host is written to the cache memory 24 (S24), as shown in FIG. 6(b). Meanwhile, in the "write through" method, the microprocessor MP2 transmits the data-write completion report (S27) to the host device (MP1) when the data is written to the external storage device (S26). In this manner, dirty data is prevented from accumulating in the cache memory 24, and thus the cache memory capacity is prevented from being overloaded.

In the "write through" method, the microprocessor MP2 responds to the host device when the data-write processing to the external storage device is complete. Accordingly, access performance of the microprocessor MP2 to the storage device A deteriorates during the "write-through cache operation". Therefore, the time period for performing the "write-through cache operation" may be limited by the amount of the cache memory used for the storage device A, the response time of the storage device with the microprocessor MP2, and the entire storage capacity amount of the cache memory. The "write-through cache operation" time may be set to a fixed value. In the "write-through cache operation", the host device may store data in the external storage device either via or not via the cache memory.

In step 1122, whether or not the amount of the cache memory used as a temporal storage resource exceeds 90% of the threshold value, while still not exceeding the threshold value, is checked. If the check result is NO, the flowchart in FIG. 11 ends without limiting the use of the cache memory. If the result is YES, it can be assumed that the amount of commands and data to input the storage device is large. Therefore, the microprocessor MP2 transmits a time-delayed command to end data-write after the timing of data-write to the cache memory so that the cache memory can receive I/O from the host device in accordance with the performance of the storage device.

In other words, the data processing number (A) for write commands to the storage device from the host device to the microprocessor is compared with the data processing number (B) for write completion commands from the storage device to the microprocessor (step 1126). If the former value is larger than the latter value, the delay time is determined based on the control table shown in FIG. 16. In FIG. 16, the delay time is determined based on A/B and the number of commands (A) per second. When A is larger than B, the delay time is set smaller as the number of commands per second is larger, and it is set larger as A/B gets larger (e.g. less than 5/4, or equal to or more than 5/4). With this delay time, the timing the host issuing a new command to write data to the storage device to the processor MPs is delayed. Accordingly, the amount of the cache memory used for the storage device is reduced and the data in the cache memory is preferentially written to the storage device A.

The present invention is not limited to the above-described embodiment and may be modified in various ways. For example, the storage device that the present invention is applied to is not limited to a storage device in an external storage controller but may be an internal storage device in the first storage controller.

We claim:

1. A storage control system in which a first storage controller is connected to a storage device in a second storage controller and the first storage controller is configured to be able to read and write data from/to the storage device in the second storage controller in response to a request from a host device connected to the first storage apparatus, the first storage controller comprising:
    a controller for controlling data transmission and reception between the host device and the storage device in the second storage controller; and a cache memory for temporarily storing the data,
    wherein the controller sets a threshold value for storage capacity in the cache memory assigned to the storage device according to at least one of:
    the class of a storage control speed of the second storage controller, a version of a controller in the second storage controller, and a storage capacity of a cache memory in the second storage controller;
    wherein the controller limits its access to the cache memory based on the usage state of the storage device;
    wherein the controller reduces the threshold value when a specific failure occurs in the storage device at a specific frequency; and
    wherein the controller determines a value subtracted from the threshold value based on the alternate path structure type in the storage device and the redundancy of the alternate paths.

2. The storage control system according to claim 1, wherein the threshold value is a ceiling value for storage capacity in the cache memory assigned to the storage device.

3. The storage control system according to claim 1, wherein the controller modifies the threshold value based on at least either the properties of the second storage controller or those of the storage device.

4. The storage control system according to claim 3, wherein the controller modifies the threshold value based on at least one of: a storage device alternate path model type; RAID level; drive type; device capacity; and average response time.

5. The storage control system according to claim 1, wherein the limit operation is at least one of: a "write-through cache operation" where the controller writes data to the storage device in response to the request from the host device without using the cache memory; "suspension operation" where the controller suspends access reception for a host device that requests data-write to the storage controller, for a predetermined time period; and "delay operation" that the controller delays issue of a report to the host device that data-write to the storage device has been completed, for a predetermined time period.

6. The storage control system according to claim 5, wherein the controller identifies any malfunction in an access path leading from the first storage controller to the storage device, and executes the suspension operation upon identifying any such malfunction.

7. A storage control system according to claim 5, wherein the controller compares the actual amount of capacity in the cache memory used for the storage device with the threshold value, and determines the delay time in the delay operation according to the comparison result.

8. The storage control system according to claim 1, wherein the controller compares the threshold value with the capacity in the cache memory used for the storage device and executes a "write-through cache operation" in which data is written to the storage device in response to the request from the host device without using the cache memory, based on the comparison result.

9. The storage control system according to claim 8, wherein the controller switches the data-write processing to the storage device in response to the request from the host device, from the usual operation using the cache memory to the "write-through cache operation", when the capacity used exceeds the threshold value.

10. The storage control system according to claim 8, wherein the controller can change the duration time of the "write-through cache operation" based on the capacity used in the cache memory.

11. The storage control system according to claim 8, wherein the controller reports completion of the data-write to the host device when writing the data to the storage device.

12. The storage control system according to claim 1, wherein the controller suspends access reception from the host device requesting data-write to the storage device for a predetermined time period when a pre-defined failure occurs in the storage device at a predetermined frequency,
    wherein dirty data is written to a secondary storage device in order to reduce the accumulation of dirty data in the cache memory for the storage device during the predetermined time period.

* * * * *